(12) United States Patent
Eckert et al.

(10) Patent No.: US 7,631,893 B2
(45) Date of Patent: Dec. 15, 2009

(54) METHOD FOR THE PRODUCTION OF A GAS BAG PACKET FOR AN AIRBAG MODULE

(75) Inventors: Nick Eckert, Berlin (DE); Patrick Isermann, Berlin (DE)

(73) Assignee: Takata-Petri AG, Aschaffenburg (DE)

( * ) Notice: Subject to any disclaimer, the term of this patent is extended or adjusted under 35 U.S.C. 154(b) by 21 days.

(21) Appl. No.: 12/213,442

(22) Filed: Jun. 19, 2008

(65) Prior Publication Data

US 2008/0258446 A1  Oct. 23, 2008

Related U.S. Application Data

(60) Division of application No. 11/652,493, filed on Jan. 12, 2007, which is a continuation of application No. PCT/DE2005/002051, filed on Nov. 14, 2005.

(30) Foreign Application Priority Data

| | | |
|---|---|---|
| Nov. 15, 2004 | (DE) | ............... 10 2004 055 657 |
| Nov. 16, 2004 | (DE) | ............... 10 2004 056 128 |
| Jun. 3, 2005 | (DE) | ............... 20 2005 009 002 U |
| Jun. 3, 2005 | (DE) | ............... 20 2005 010 863 U |
| Jul. 5, 2005 | (DE) | ............... 20 2005 010 864 U |

(51) Int. Cl.
    *B60R 21/20* (2006.01)
(52) U.S. Cl. ............... 280/743.1; 280/728.1; 280/728.2; 53/116; 53/117; 53/429; 53/433; 53/511
(58) Field of Classification Search ............... 280/728.1, 280/728.2, 743.1; 53/429, 433, 116, 117, 53/511
See application file for complete search history.

(56) References Cited

U.S. PATENT DOCUMENTS

| | | | |
|---|---|---|---|
| 3,712,568 A | | 1/1973 | Grasso et al. |
| 5,096,222 A | * | 3/1992 | Komerska et al. ........... 280/732 |
| 5,140,799 A | * | 8/1992 | Satoh ........................ 53/429 |
| 5,184,843 A | | 2/1993 | Berger et al. |
| 5,344,182 A | | 9/1994 | Lauritzen et al. |
| 5,378,011 A | | 1/1995 | Rogerson et al. |
| 5,421,607 A | | 6/1995 | Gordon |
| 5,447,329 A | | 9/1995 | Hamada |
| 5,558,362 A | | 9/1996 | Acker et al. |
| 5,692,606 A | | 12/1997 | Elmaleh |
| 5,772,241 A | | 6/1998 | Heilig |
| 5,791,682 A | | 8/1998 | Hiramitsu et al. |
| 5,921,575 A | * | 7/1999 | Kretschmer et al. ...... 280/728.2 |
| 6,115,998 A | | 9/2000 | Reh et al. |
| 6,250,675 B1 | | 6/2001 | Dietsch et al. |
| 6,260,330 B1 | | 7/2001 | Borowski et al. |
| 6,305,150 B1 | | 10/2001 | Dietsch |
| 6,328,332 B1 | | 12/2001 | Schütz |

(Continued)

FOREIGN PATENT DOCUMENTS

CN          1133243 A          10/1996

(Continued)

*Primary Examiner*—Paul N. Dickson
*Assistant Examiner*—Barry Gooden, Jr.
(74) *Attorney, Agent, or Firm*—Foley & Lardner LLP

(57) ABSTRACT

A process for producing an airbag packet for an airbag module is provided. The airbag is folded up in a folding apparatus to form an airbag packet. Then, the airbag packet is enclosed in a gastight manner by a flexible envelope, wherein the airbag packet is at least partially enclosed by the envelope while it is still in the folding apparatus.

10 Claims, 6 Drawing Sheets

U.S. PATENT DOCUMENTS

| | | |
|---|---|---|
| 6,367,835 B1 | 4/2002 | Maguire |
| 6,588,179 B2 | 7/2003 | Haley et al. |
| 6,616,587 B2 | 9/2003 | Kleeberger et al. |
| 6,619,015 B2 | 9/2003 | Arwood et al. |
| 6,718,725 B2 | 4/2004 | Farwig et al. |
| 6,824,163 B2 | 11/2004 | Sen et al. |
| 7,431,330 B2 * | 10/2008 | Korechika ............... 280/730.1 |
| 2001/0048216 A1 | 12/2001 | Varcus et al. |
| 2002/0135160 A1 | 9/2002 | Lorenz |
| 2003/0052480 A1 | 3/2003 | Bohn |
| 2004/0239085 A1 | 12/2004 | Vitet |
| 2007/0108752 A1 | 5/2007 | Eckert et al. |

FOREIGN PATENT DOCUMENTS

| | | |
|---|---|---|
| DE | 41 41 617 A1 | 7/1992 |
| DE | 91 01 099 | 7/1992 |
| DE | 694 10 870 T3 | 10/1994 |
| DE | 694 21 638 T2 | 10/1994 |
| DE | 44 19 565 A1 | 3/1995 |
| DE | 43 40 999 A1 | 6/1995 |
| DE | 44 15 374 A1 | 11/1995 |
| DE | 296 06 830 U1 | 9/1996 |
| DE | 195 35 564 A1 | 3/1997 |
| DE | 297 05 753 U1 | 7/1997 |
| DE | 298 15 940 U1 | 11/1998 |
| DE | 100 20 677 A1 | 10/2001 |
| DE | 101 14 208 A1 | 5/2002 |
| DE | 10 2004 056 128 A1 | 1/2007 |
| EP | 0 620 140 B2 | 3/1994 |
| EP | 0 620 139 B1 | 10/1994 |
| EP | 1 314 618 A2 | 5/2003 |
| EP | 1 464 551 A1 | 10/2004 |
| EP | 1 506 896 A1 | 2/2005 |
| GB | 2 349 618 A | 11/2000 |
| GB | 2 371 025 A | 7/2002 |

* cited by examiner

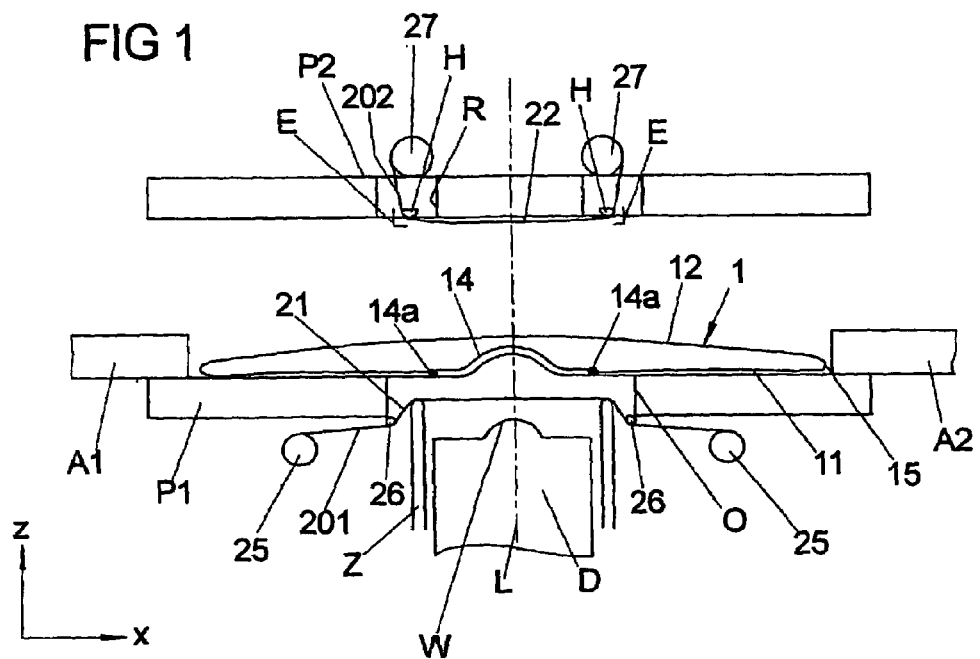
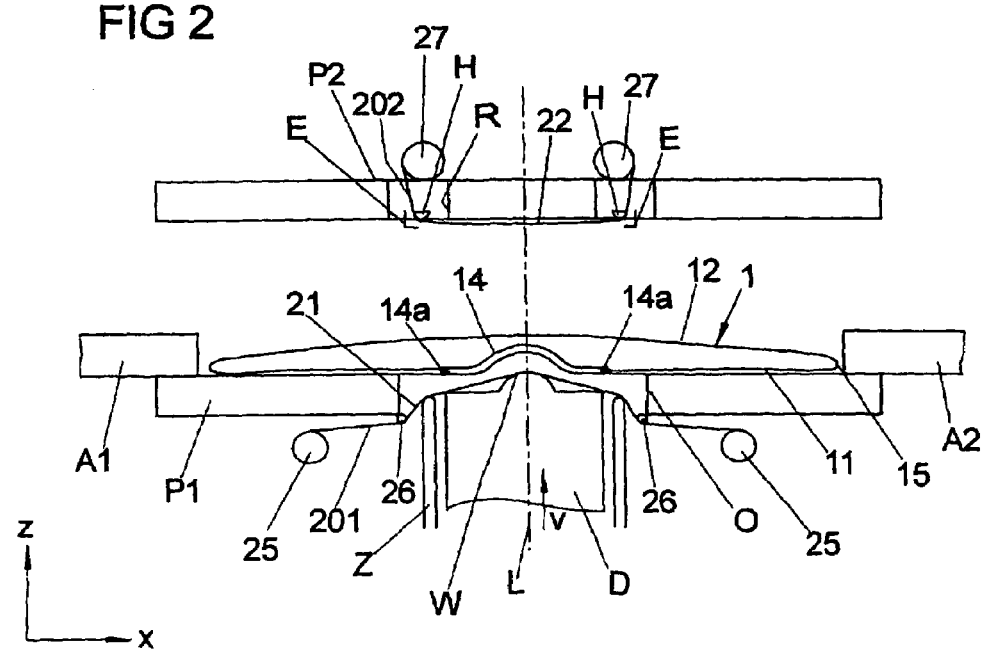

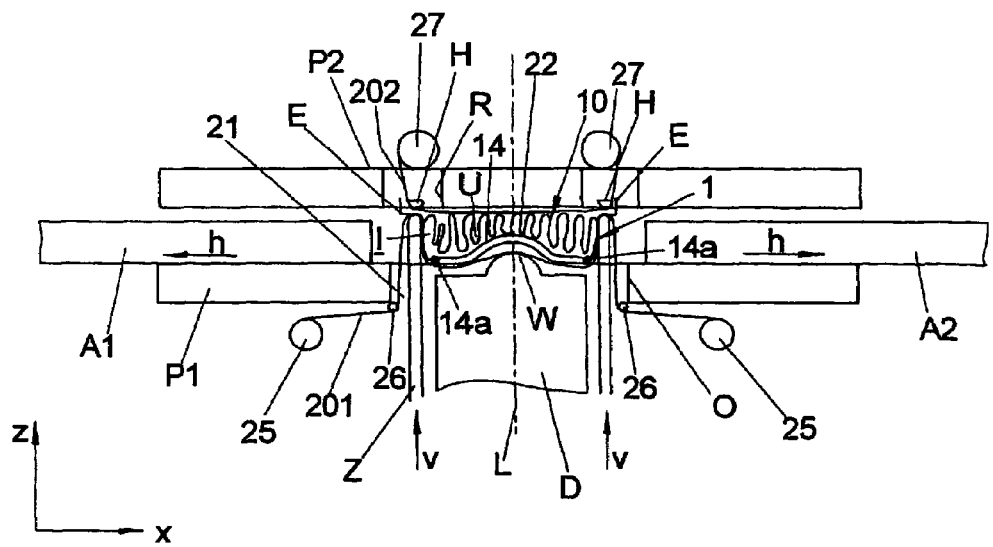
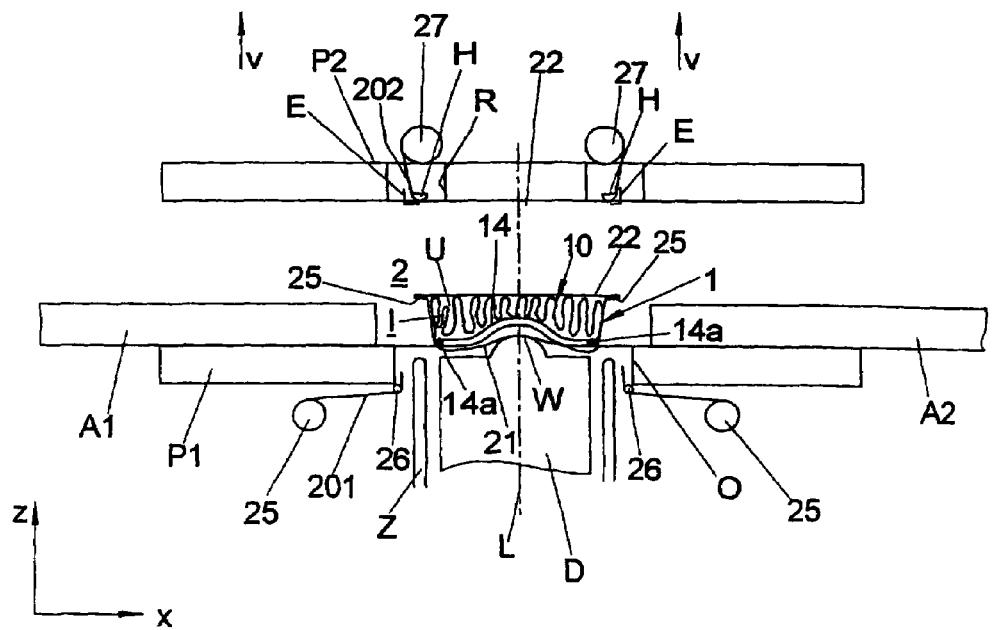

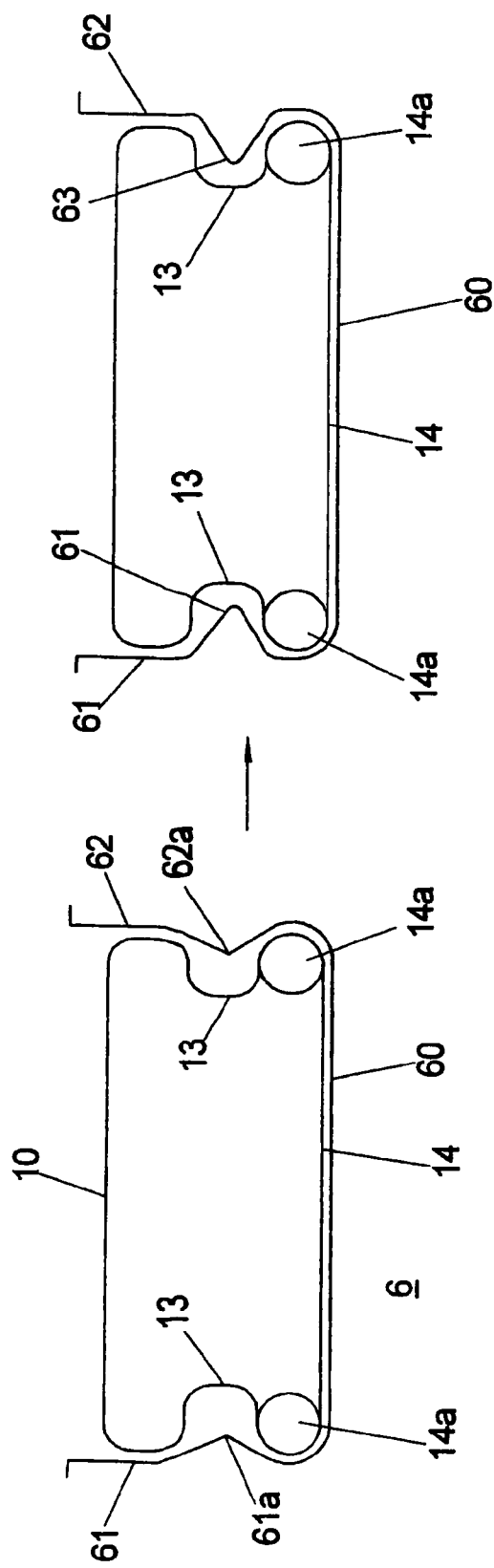

METHOD FOR THE PRODUCTION OF A GAS BAG PACKET FOR AN AIRBAG MODULE

CROSS-REFERENCE TO RELATED APPLICATIONS

This application is a divisional application of application Ser. No. 11/652,493, filed Jan. 12, 2007, which is a continuation of International Application PCT/DE2005/002051, which has an international filing date of Nov. 14, 2005; this International Application was not published in English, but was published in German as WO 06/050720. Both applications have been incorporated herewith in their entirety.

BACKGROUND

The invention relates to a process for producing an airbag packet for an airbag module.

In a process of this type which is known from DE 101 14 208 A1 (incorporated by reference herein), the airbag, after it has been folded, is packed in an envelope and then a subatmospheric pressure is generated in the interior of the envelope. After that, the envelope is closed in a gastight manner. This minimizes the packed size of the airbag packet and at the same time protects the airbag from being adversely affected by moisture and dust. One problem in this context, however, is that there is a risk of the airbag packet expanding or being released during or after removal of the airbag, which has been folded into an airbag packet, from the folding machine in order for the airbag packet to be packed in an envelope, and this makes further handling more difficult.

The present invention therefore also deals in particular with features which occur when a folded airbag packet is accommodated in a flexible envelope (film) which encloses the airbag packet, which has been reduced to the minimum packet dimensions by means of subatmospheric pressure, in a gastight manner in order to maintain subatmospheric pressure, in which context in particular the necessity of generating and maintaining subatmospheric pressure in the airbag packet enclosed in a gastight manner by the envelope is to be taken into consideration.

The invention is therefore based on the problem of further improving a process for producing an airbag packet, which is enclosed in a gastight manner by an envelope, for an airbag module of the type described in the introduction.

SUMMARY

According to one disclosed embodiment, an airbag packet is enclosed at least partially, i.e. on more than one side, by an envelope in the folding machine in which the airbag packet has been produced from an airbag to be folded.

According to another embodiment, the gastight enclosing of the airbag packet in the flexible envelope takes place while the airbag packet is still at least partially bounded by folding elements which act on the airbag as it is being folded to form an airbag packet. These folding elements may be on the one hand at least one active folding element, which acts on the airbag during folding of the airbag with a movement towards the interior of the airbag in order to convert the airbag into a folded airbag packet, and/or on the other hand at least one passive folding element, which during folding of the airbag extends along one side of the airbag and limits the size of the airbag perpendicular to this plane of extent.

According to yet another embodiment, with regard to the folding elements (e.g. passive elements) which continue to bound the airbag as before while the airbag packet is being enclosed in a gastight manner in the flexible envelope, in order to prevent its subsequent expansion along defined spatial directions, the flexible envelope runs between the respective folding element and the airbag to be folded even while the airbag is being folded to form an airbag packet, so that the folding element is acting on the airbag via the flexible envelope, i.e. with the flexible envelope between them, even while the airbag is being folded.

According to yet another embodiment, at least two separate flexible envelope elements, one of which preferably encloses the airbag packet substantially in a cup-like manner and the other of which forms a covering surface, are used to enclose the airbag packet in a gastight manner.

According to another embodiment, the cup-like envelope element is formed when the airbag packet is being enclosed, by slides and/or a shaping body being guided along the edge of the airbag packet, in the process positioning the corresponding envelope element in a cup-like manner along the outer side of the airbag packet. The movement of those slides or the shaping body may, for example, take place during a phase in which the folding elements which previously acted on the corresponding regions of the outer side of the airbag packet during folding of the airbag packet are being moved away from the airbag packet.

According to still another embodiment, the cup-shaped envelope element has already been pre-shaped before the airbag packet is pressed into the cup-shaped envelope element, for example by means of a ram. For this purpose, the pre-shaped, cup-like envelope element is fixed to the folding apparatus even during folding and at the latest by the end of the folding process, so that the airbag packet can be introduced into the cup-like envelope element. A folding element which was previously active during the folding of the airbag to form an airbag packet can preferably be used for this purpose, i.e. acting as a ram.

According to yet another embodiment, the envelope used to enclose the folded airbag packet in a gastight manner or the envelope elements used for this purpose are preferably severed from an "endless strip" (guided on a roll) of envelope material, specifically using separating means provided at the folding apparatus, for example in the form of a heating device which is used to melt the envelope at the separating positions. Furthermore, tear lines, along which the envelope tears in the event of the airbag packet subsequently unfolding as a result of a crash, may be provided in the envelope.

According to another embodiment, a subatmospheric pressure is generated (by evacuation) in the space enclosed by the envelope after the airbag packet has been introduced into the envelope, i.e. after the airbag packet has been enclosed by the envelope, and before the final gastight closure of the envelope. The intention of this is to reduce the packing volume as much as possible. The evacuation means provided for this purpose, for example in the form of evacuation nozzles, are advantageously arranged at the folding apparatus in which the airbag has first of all been folded to form an airbag packet and has then been accommodated in a flexible envelope.

According to another embodiment, to enable the folded airbag packet surrounded by an envelope to be fixed to a module housing of an airbag module without damaging the envelope, it is preferable to provide for positively locking securing of the airbag packet to the module housing, for example by means of an inlay part which is arranged in the airbag packet and forms a positively locking region (e.g. in the form of an undercut) which can be brought into engagement with an associated positively locking region of the module housing.

According to yet another embodiment, during or after the folding of the airbag, it is possible to produce a depression in the airbag packet, by means of which the airbag packet can be arranged or fixed in a positively locking manner on a housing of an airbag module by a protuberance on the housing engaging in the depression in the airbag packet, it being possible for the depression to adjoin an inlay part of the type described above, so that together they contribute to securing the airbag packet to the module housing in a positively locking manner. To form a depression of this type in the airbag packet, it is possible to provide an element, in particular in the form of a ram, which can move into the airbag packet during the folding of the airbag and which preferably acts on the airbag packet with the flexible envelope between them, so that the flexible envelope is also depressed in the region of the depression in the airbag packet.

According to still another embodiment, it is also possible to dispense with the need to form a depression in the airbag packet which complements the inlay part when producing a positively locking connection to a module housing if the envelope surrounding the airbag packet is evacuated to a sufficient extent for the associated reduction in the size of the airbag packet to expose the contour of the inlay part arranged therein to produce a positively locking connection.

According to one embodiment an apparatus for carrying out the process according to the invention is characterized by having folding elements for folding an airbag to form an airbag packet, and means for introducing the airbag packet into an envelope which encloses the airbag packet.

According to another embodiment, an airbag packet which can be produced by the process according to the invention is wherein the envelope is formed by at least two separate envelope elements, which together enclose the airbag packet in a gastight manner and for this purpose are joined to one another in a gastight manner in a suitable form (for example by welding or adhesive bonding). This enables, in a particularly simple and effective way, the airbag packet to be enclosed by the envelope as early as in the folding apparatus for folding the airbag, for example by forming the cup-like envelope element in the folding apparatus by enclosing the airbag packet in a cup-like manner with a flexible envelope element and then closing off the cup-like envelope element together with the airbag arranged therein with a further envelope element.

According yet another embodiment, which can also be applied and implemented independently of the two-part design of the envelope and of the gastight design of the envelope, regions which adjoin one another in the airbag packet and in the envelope are each provided with a depression or a projection, by means of which the airbag packet together with the envelope can be fixed in a positively locking manner to a module housing. In this case, an inlay part, which can engage in an undercut in a module housing, can be arranged in the airbag packet, the depression or projection preferably being formed by the inlay part and/or adjoining the inlay part.

It is to be understood that both the foregoing general description and the following detailed description are exemplary and explanatory only, and are not restrictive as claimed.

BRIEF DESCRIPTION OF THE DRAWINGS

FIG. 1 shows a diagrammatic sectional view of a folding apparatus for an airbag of an airbag module after the airbag has been introduced.

FIG. 2 shows the folding apparatus from FIG. 1 after a first process step of folding the airbag.

FIG. 5 shows the folding apparatus from FIG. 1 while the airbag is being enclosed by a flexible envelope.

FIG. 6 shows the folding apparatus from FIG. 1 after the airbag packet has been enclosed by a flexible envelope.

FIGS. 9a and 9b show a third modification to the exemplary embodiment of the module housing shown in FIG. 7.

DETAILED DESCRIPTION

Figure 3:
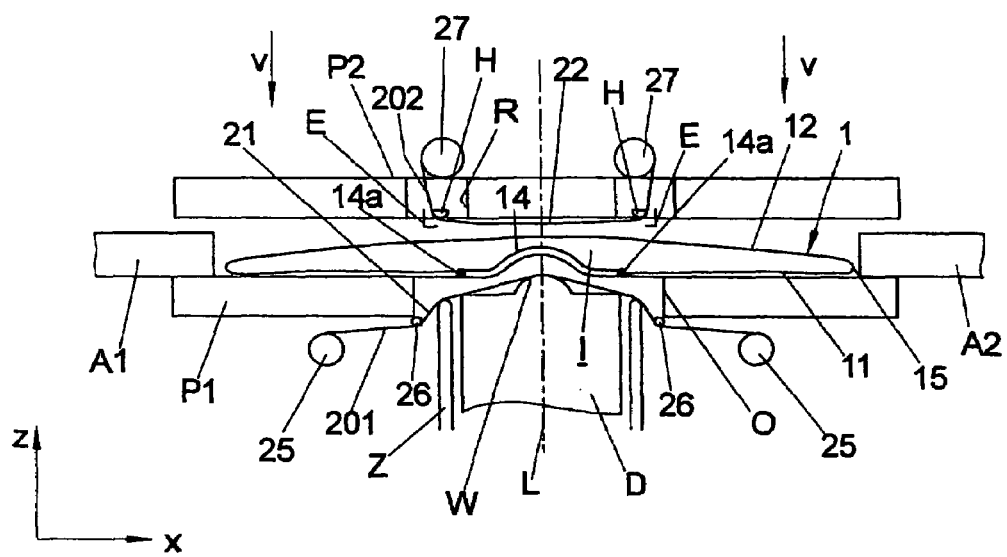
FIG. 3 shows the folding apparatus from FIG. 1 after a second process step of folding the airbag.

Embodiments of the present invention will be described below with reference to the accompanying drawings. It should be understood that the following description is intended to describe exemplary embodiments of the invention, and not to limit the invention.

FIG. 1 shows a folding apparatus in the form of a folding machine for folding an airbag 1, with two passive plates P1 and P2 in the form of a bottom plate and a top plate, by means of which the empty airbag 1 which is laid out on the bottom plate P1 is limited in terms of its extent in the vertical direction (along a vertical axis z) during folding. The airbag 1 laid out on the bottom plate P1, in the state illustrated in FIG. 1, has its underside 11 resting on the bottom plate P1 before a folding operation commences, while the opposite top side 12 of the airbag 1 is still at a clear distance along the vertical axis z from the associated top plate P2.

According to one embodiment of the invention, the folding apparatus has two active folding elements A1, A2 in the form of slides which can move with respect to one another along a horizontal axis x towards the interior I of the airbag 1 to be folded, face the outer edge 15 of the airbag 1 and by means of which the airbag 1 which is to be folded can be gathered up towards a center. According to one embodiment of the invention, other folding elements (not shown in FIG. 1) can be provided to bound the airbag 1 and/or to act on the airbag 1 along an axis running perpendicular to the plane of the drawing, i.e. perpendicular to the horizontal axis x and perpendicular to the vertical axis z.

The bottom plate P1 of the folding apparatus has a central opening O, concentrically to which a ram D with a convexity W facing the airbag 1, more specifically the airbag's 1 underside 11, and a cylindrical shaping body Z, which is designed as a slide and engages around the ram D, are arranged. Both the ram D and the hollow-cylindrical shaping body Z are spaced apart from the airbag 1, specifically its underside 11, in the vertical direction z.

The designations horizontal axis x and vertical axis z are in the present context selected in such a way that the arrangement of these two axes along different spatial directions, in particular spatial directions which are perpendicular to one another, is clear. For use of the process according to the invention, it is not important for the x axis referred to here as a horizontal axis actually to run horizontally, i.e. parallel to the ground. The same is true of the z axis where it is referred to as a vertical axis.

According to one embodiment of the invention, in the region of the opening O in the bottom plate P1, a flexible envelope element, which is in the form of a film section 21 and forms a section of an ("endless") stretchable film material 201 guided over a plurality of rolls 25, 26, extends between the ram D and the cylindrical shaping body Z, on the one hand, and the airbag 1, more specifically its underside 11, on the other hand.

An annular opening R, which is arranged concentrically with the opening O in the bottom plate P1, is provided in the top plate P2 of the folding apparatus arranged above the bottom plate P1 along the vertical axis z. A further flexible envelope element in the form of a film section 22, which extends between the top plate P2 and the airbag 1, more specifically its top side 12, and is spaced apart from the airbag 1 in the direction of the vertical axis z, is guided through this annular opening R. This film section 22 likewise forms a section of an ("endless") stretchable film material 202 guided over rolls 27.

According to one embodiment of the invention, (electrical) heating elements H and evacuation means E in the form of evacuation nozzles are arranged in the shape of a ring in the region of the annular opening R in the top plate P1; their function will become clear in the following description of the mode of operation of the folding apparatus illustrated in FIG. 1 with reference to FIGS. 2 to 6.

According to one embodiment of the invention, an inlay part 14, in the form of a frame part, which runs in curved fashion between two lateral ends, is arranged in the interior of the airbag 1 that is to be folded in the folding apparatus; this inlay part 14, above the passage opening O in the bottom plate P1 of the folding apparatus, extends along the underside 11 of the airbag 1 between two lateral end sections 14a, 14a, has a cross section curved so as to match the convexity W of the ram D and is connected to the adjoining region of the underside 11 of the airbag 1.

To fold the airbag 1 using the folding apparatus described with reference to FIG. 1, first of all the ram D is displaced in the vertical direction v parallel to the vertical axis z in the direction towards the airbag 1, specifically its underside 11, with the film section 21 running above the ram D being carried along with it and being guided, by means of the convexity W of the ram D, into that section of the underside 11 of the airbag 1 which bears against the frame part 14.

In the next step, as shown in FIGS. 2 and 3, the top plate P2 of the folding apparatus is moved in the direction towards the airbag 1, namely its top side 12, so that it, together with the bottom plate 11, bounds the folding space available for the airbag packet being formed during folding of the airbag 1 along the vertical axis z, i.e. at the top and bottom in the exemplary embodiment.

Figure 4:
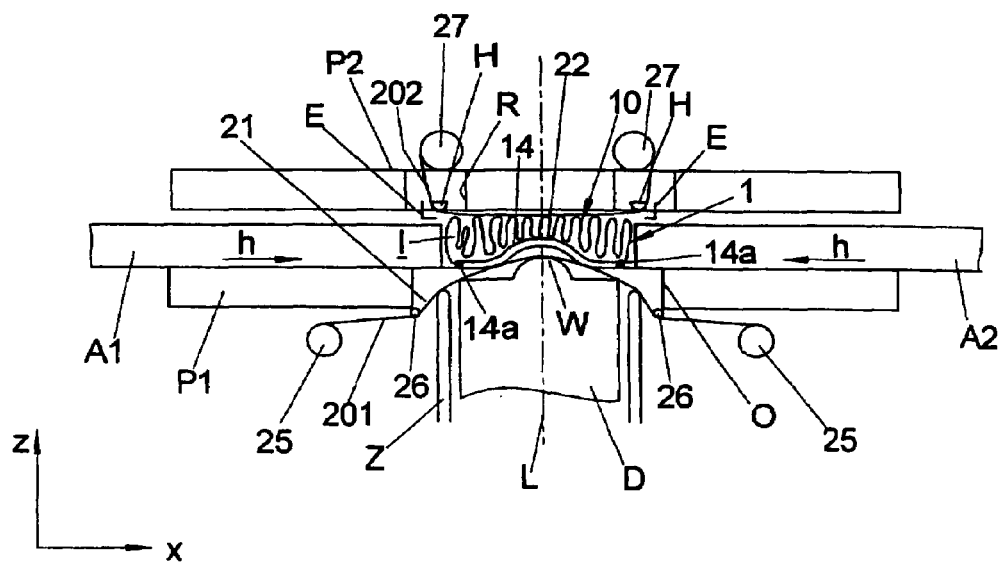
FIG. 4 shows the folding apparatus from FIG. 1 after the folding of the airbag to form an airbag packet.

Then, as shown in FIGS. 3 and 4, the active folding elements A1, A2, which are designed as slides, are moved towards one another in the horizontal direction h parallel to the horizontal axis x as far as the outer edge 15 of the airbag 1, with the airbag arranged between the folding elements A1, A2 being gathered up towards a center. Corresponding slides can be used to fold or gather up the airbag along the direction running perpendicular to the vertical axis z and to the horizontal axis x (perpendicular to the plane of the drawing), as is known, for example, from DE 195 35 564 C2. This results, as shown in FIG. 4, in an airbag packet 10 which has been folded by being gathered up and is arranged in the folding space bounded by the passive folding elements (bottom plate P1 and top plate P2) and by the active folding elements A1, A2.

According to one embodiment of the invention, the airbag packet 10, which has been folded together to take up the smallest possible space in order for it to be used in a space-saving fashion in an airbag module, is then, as shown in FIG. 5, introduced into an envelope formed by the two film sections 21, 22 and closed off in a gastight manner therein.

For this purpose, first of all, as shown in FIG. 5, the cylindrical shaping body Z is moved in the vertical direction through the opening O in the bottom plate P1 towards the top plate P2 while the active folding elements A1, A2 are being moved away from the airbag packet 10 in the horizontal direction h. In the process, the film section 21 which engages over the hollow cylindrical frame Z is carried along, so that it forms a cup-shaped pocket for the airbag packet 10 and surrounds the packet 10 in a cup-like manner. The corresponding film section 21 is lifted by means of the hollow-cylindrical shaping body Z to such an extent that the cup-like film section 21 which is formed extends, at its top edge, as far as the heating elements H and evacuation means E provided at the top plate P2.

In this state of the folding apparatus, the film section 22 arranged in front of the top plate T forms a covering surface which closes off the opening side of the cup-shaped film section 21. The two film sections 21, 22 together therefore form a flexible envelope which completely surrounds the airbag 1 that has been folded to form an airbag packet 10.

According to one embodiment of the invention, in the region in which the two film sections 21, 22 bear against one another, the angled-off evacuation means E project into the space U surrounded by the film sections 21, 22, so that a subatmospheric pressure can be generated in this space by evacuation of air. This allows the package volume of the airbag packet 10 to be reduced still further, and the airbag packet 10 is kept in the state of minimal package volume by the film sections 21, 22 which enclose the airbag packet 10 on all sides being closed off in a gastight manner. For this purpose, after the subatmospheric pressure has been generated in the space U enclosed by the envelope 2, the two film sections 21, 22 are joined to one another in a sealing manner in their contact region by the film material being fused by means of the heating elements H provided for this purpose. The two film sections 21, 22 are simultaneously severed from the respective film material guided around the associated rolls 25, 26 and 27.

As a result, the introduction of the airbag packet 10 into the envelope formed by the two film sections 21, 22, the generation of a subatmospheric pressure in the envelope 2 and the gastight closure of the envelope 2 by welding of the film sections 21, 22 take place in the folding machine in which the airbag packet 10 had previously been produced by folding an airbag 1. In this case, the top plate P2 and the opposite ram D, as before, continue to bound the airbag packet 10 and prevent it from spreading out along a (vertical) spatial direction z. By contrast, the two active folding elements A1, A2 have been moved away from the airbag packet 10 along the spatial direction x which is perpendicular to the spatial direction z, so that the hollow-cylindrical shaping body Z used to form the cup-like film section can be moved along the edge of the airbag packet 10.

According to one embodiment of the invention, in the case of a multilayer film, desired tearing points in the form of perforations are preferably provided in one of the film sections 21, 22, in particular the film section 22 forming a covering surface of the envelope 2, along which perforations the envelope 2 can be torn when the airbag is inflated at a later stage, when it forms part of an airbag module, as a result of crash, so to unfold. In this case, the film layer which ensures the shape of the enclosed airbag packet and has been perforated to form defined weak points has to be covered by a further (in relative terms thinner) film layer which is responsible for providing a gastight closure despite the perforations.

According to one embodiment of the invention as shown in FIG. 6, the top plate P2 of the folding apparatus is only removed from the airbag packet 10 in the vertical direction v along the vertical axis z after the gastight envelope 2 for the airbag packet 10 has been completed, so that this packet is no longer restricted in the vertical direction and can be removed from the folding machine. There is then no longer any risk of the airbag packet 10 being able to expand unintentionally during removal of the airbag packet 10 from the folding apparatus, the transporting of the airbag packet 10 to a further assembly station or installation of the airbag packet 10 in an airbag module, in particular a module housing provided for this purpose.

According to one embodiment of the invention a modification to the exemplary embodiment illustrated with reference to FIGS. 1 to 6 will be described. For example, the cup-like envelope element, which ultimately surrounds the airbag packet 10 to form an envelope 2, can consist of a material which is sufficiently dimensionally stable for it to be pre-shaped in the shape of a cup, for example by thermoforming, by means of a hot ram. This cup-shaped envelope element would then in a folding apparatus of the type illustrated in FIGS. 1 to 6, be arranged instead of the hollow-cylindrical frame Z concentrically with respect to the passage opening O in the bottom plate P1, so that the fully folded airbag packet 10 can be pressed into this cup-shaped pocket by means of a ram from the folding space enclosed by the folding elements. Then, the top surface of the cup-shaped pocket, which is still open, is once again closed off by a further envelope element, e.g. in the form of a film section. This preferably takes place directly in the folding apparatus itself. However, it is also possible to provide the pre-shaped cup-shaped pocket, together with the airbag packet which has been packed into it, to be transported under stress to a further station, where the still open top surface is closed off, then a subatmospheric pressure is generated and then the cup-shaped pocket and the top surface are joined to one another in a gastight manner, for example by welding.

Overall, the process described, by simple and reliable process steps, allows the package volume of an airbag packet to be considerably reduced and at the same time protects the airbag packet from environmental influences, it being possible to automate the handling of the airbag packet 10 packaged in a gastight manner in the envelope 2 during further assembly of an airbag module without problems, since there is no risk of undesired expansion of the airbag packet. In this context, however, it should be borne in mind that, on account of the gastight enveloping of the airbag packet 10, the standard securing of the airbag to the airbag module, e.g. to the module housing or a generator carrier, by screws, bolts or similar securing elements which penetrate through the airbag, would lead to damage to the gastight envelope.

The airbag packet 10 which has been packaged in a gastight manner in an envelope 2, of the type illustrated in Figure, is therefore, as described below with reference to FIGS. 7 to 9b, preferably fixed in a positively locking manner to an airbag module, in particular a module housing, using positively locking regions formed on the airbag packet 10 and on the module housing, such as for example the end sections 14a, 14a of a frame 14 which is arranged as an inlay part in the interior I of the airbag 1 and is joined to the surface of the airbag 1 at least in regions, and depressions 13, 23, provided adjacent to this inlay part, of the airbag packet 10 and the envelope 2, which are stabilized by the frame 14.

Figure 7:
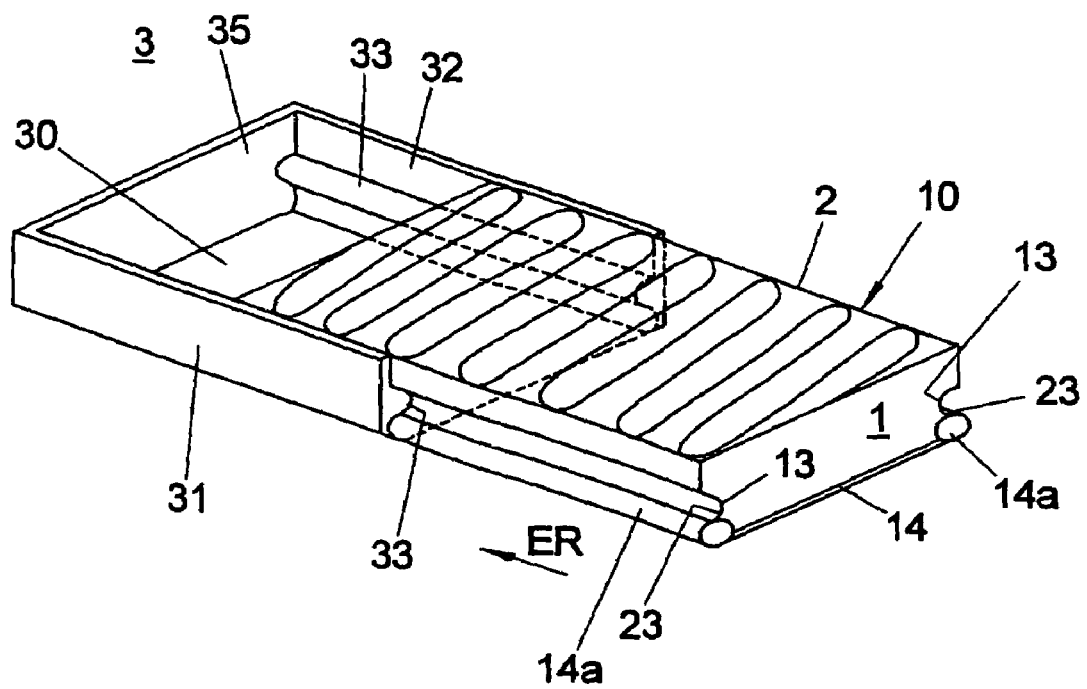
FIG. 7 is a perspective view of a folded airbag packet as it is being installed in a module housing.

According to one embodiment of the invention, illustrated in FIG. 7, a modular housing 3 with a bottom surface 30 which is at least partially open (for connection of a gas generator), two side walls 31, 32 and a back wall 35 is designed in such a way that a folded airbag packet 10, together with the envelope 2 enclosing it, can be introduced into the module housing 3 through an open side of the housing 3 lying opposite the back wall 35. Positively locking regions 33 in the form of convex curvatures, which in each case run in the insertion direction ER of the airbag packet 1, engage in associated depressions 13, 23 formed on the airbag packet 10 and the envelope 2 and stabilized by a sewn-in frame 14 extending between two end sections 14a, and have the end sections 14a of the frame 14 engaging behind them in a positively locking manner, extend in the side walls 31, 32 of the module housing 3.

Therefore, positively locking regions with undercuts, which allow the airbag packet 10 together with the envelope 2 to be inserted into the module housing 3 so that the airbag packet 10 together with the envelope 2 is held in a positively locking manner in the module housing 3, are formed on the module housing 3, on the one hand, and on the airbag packet 10 and the associated envelope 2, on the other hand. The side of the module housing 3 which lies opposite the back wall 35 of the module housing 3 and is opened for insertion of the airbag packet 10 can then be closed.

Figure 8A:
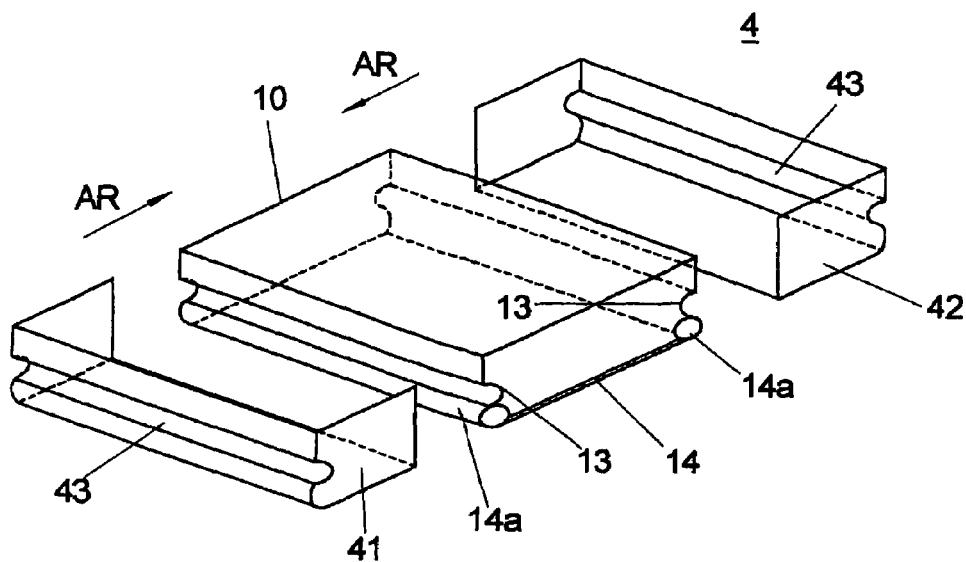
FIG. 8a is an exploded view of the a modification to the exemplary embodiment of the module housing shown in FIG. 7.

FIG. 8a shows a first modification to the exemplary embodiment from FIG. 7 with regard to the design of the module housing 4, which in the present case comprises two housing parts 41, 42 which are angular in cross section and are moved towards one another along a receiving direction AR to receive the airbag packet 10. In the process, positively locking regions 43 provided on each of the two housing parts 41, 42 in the form of convex curvatures engage in the corresponding positively locking regions 13 of the airbag packet 10, formed by recesses.

Figure 8B:
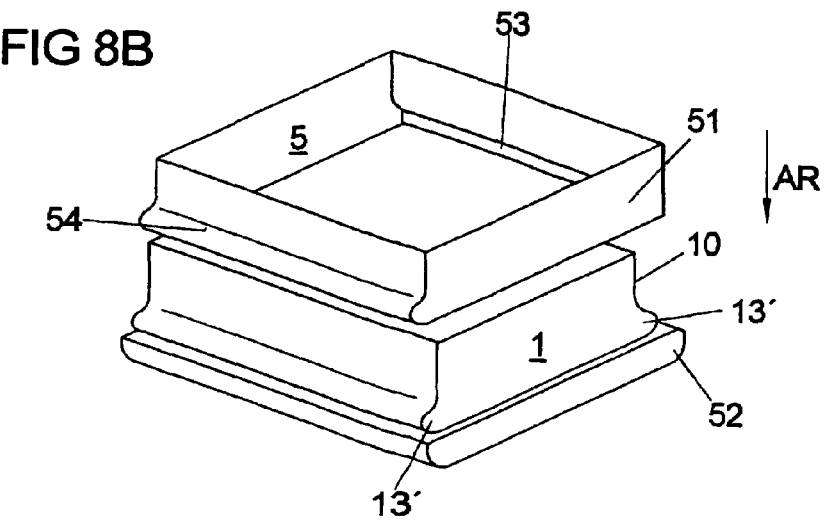
FIG. 8b shows a second modification to the exemplary embodiment of the module housing shown in FIG. 7.

In FIG. 8a, as in the following FIGS. 8b and 9a and 9b, the envelope 2 enclosing the airbag packet 10 is not illustrated, for the sake of simplicity, since the housing principle used in each instance is independent of whether or not the airbag is enclosed by an envelope. Of course, the exemplary embodiments of a module housing 4, 5 and 6 illustrated in FIGS. 8a, 8b and 9a and 9b are in each case optimally suited to receiving the airbag packet 10 surrounded by an envelope 2 as illustrated in FIG. 7. Therefore, in particular the airbag packets 10 illustrated in FIGS. 8a, 8b and 9a and 9b can in each case also be imagined as being enclosed by an envelope 2. The airbag packet 10 illustrated in FIG. 8a would then be identical to the airbag packet 10 enclosed by an envelope 2 illustrated in FIG. 7.

FIG. 8b shows a modification to the exemplary embodiment shown in FIG. 8a with regard to the design of both the airbag packet 10 and the module housing 5. According to one embodiment of the invention and in accordance with FIG. 8b, the airbag packet 10 has, as positively locking regions 13', outwardly protruding convex curvatures, formed by an inlay part in the form of a frame, and the module housing according, in a housing part 51 which encloses the airbag packet 10, has indentations 53, which can be brought into engagement with the convex curvatures 13', in a housing part 51 enclosing the airbag packet 10. In this case, the housing part 51 which encloses the airbag packet 10 is closed off on its side which is open for the insertion of the airbag packet 10 by a further housing part 52, which is designed as a flat covering and has a passage opening for the gases of a gas generator. In this case, no additional depressions were formed on the airbag packet 10.

A common feature of the embodiments illustrated in FIGS. 8a and 8b is that the housing parts 41, 42 and 51, 52 of the respective module housing 4 and 5 are moved towards one another along a direction AR perpendicular to the direction of extent of the positively locking regions 13, 13', 43, 53 to receive the respective airbag packet 10, whereas in the exemplary embodiment illustrated in FIG. 7 the airbag packet 10 is inserted into the module housing 3 in the direction of extent ER of the positively locking regions 13, 33 associated with one another.

In the exemplary embodiment illustrated in FIG. 9a, an airbag packet 10, which has been provided in opposite lateral end sections with positively locking regions 13 in the form of depressions and has a frame 14 which in cross section extends between two end sections 14a, for stabilizing the positively locking regions 13 in the form of indentations, is arranged in a module housing 6 which includes a base surface 60 and opposite side walls 61, 62. The side walls 61, 62 of this module housing are each provided with desired deformation locations 61a and 62a, respectively, for forming a housing-side positively locking region which engages in the positively locking regions 13 of the airbag packet 10.

At these locations, positively locking regions 63 in the form of convex curvatures, which engage in a positively locking manner in the associated depressions or indentations 13 in the airbag packet 10 and thereby produce the desired positively locking connection, are formed by inwardly directed forces or pressure acting on the desired deformation locations 61a, 62a. In particular the frame 14 provided in the airbag packet 10 is held with its lateral end sections 14a positively locked in the housing 6 by virtue of the fact that it engages behind the projections or convex curvatures 63 provided there and/or engages in the undercuts formed by these positively locking regions. If the airbag packet 10 is made sufficiently resilient, the depressions 13 may alternatively also be produced only when the positively locking regions 63 in the form of convex curvatures on the module housing 6 are being formed.

This method of fixing an airbag packet 10 to a module housing 3, 4, 5 or 6 not only prevents damage to a gastight envelope 2 surrounding the airbag packet 16 but also facilitates assembly. In particular, there is no need for the actuation of additional securing means in the form of screws, bolts or the like. The insert part in the form of a frame 14 provided in the airbag packet 10 can in this case simultaneously form a diffuser and therefore perform a dual function, namely the function of effecting a defined distribution of the flow of gas in the airbag in addition to the function of fixing the airbag packet 10 to the housing.

The solution according to the invention has the advantage that it is possible to produce an airbag packet which is enclosed (in a gastight manner) by a flexible envelope, can be handled flexibly with a minimal volume and can be integrated in a small airbag module for motor vehicles, by simple means and with a high level of process reliability, by at least some of the working steps required to enclose the airbag packet in a flexible envelope in a gastight manner being carried out in the folding apparatus itself.

The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. The embodiment was chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents.

What is claimed is:

1. An airbag module of a motor vehicle comprising:
    an airbag packet including a folded airbag enclosed in a gastight manner by an envelope, wherein the envelope is formed by at least two separate envelope elements, which together enclose the folded airbag in a gastight manner;
    a module housing for receiving the airbag packet together with the envelope enclosing the folded airbag on all sides; and
    an inlay part which is arranged in the airbag packet and which is configured to engage in an undercut of the module housing.

2. An airbag module according to claim 1, wherein one envelope element is formed cup-like and the other envelope element closes off a free covering surface of the cup-like envelope element.

3. An airbag module according to claim 1, wherein regions which adjoin one another in the folded airbag and in the envelope are each provided with a depression or a projection, so that the airbag and the envelope are fixed in a positively locking manner to the module housing.

4. An airbag module according to claim 3, wherein the depression or projection is formed by the inlay part.

5. An airbag module according to claim 3, wherein the depression or projection adjoins the inlay part.

6. An airbag module according to claim 3, wherein the module housing comprises a base surface and opposite side walls.

7. An airbag packet according to claim 6, wherein each of the opposite side walls has a deformation location for forming a housing-side positively locking region, which engages the depression or the projection of the airbag packet.

8. An airbag packet according to claim 7, wherein the housing-side positive locking region is formed by inwardly directed force or pressure acting on the deformation location.

9. An airbag packet according to claim 8, wherein the inwardly directed force or pressure is applied to the deformation location after the airbag packet is inserted into the module-housing.

10. An airbag packet according to claim 8, wherein the inwardly directed force or pressure applied to the deformation location forms the depression in the airbag packet.

* * * * *